United States Patent
Wada

(10) Patent No.: US 10,315,686 B2
(45) Date of Patent: Jun. 11, 2019

(54) BRUSHLESS MOTOR, AND ELECTRIC POWER STEERING APPARATUS AND VEHICLE EQUIPPED WITH THE SAME

(71) Applicant: NSK Ltd., Tokyo (JP)

(72) Inventor: Toshimasa Wada, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/302,607

(22) PCT Filed: Aug. 10, 2015

(86) PCT No.: PCT/JP2015/072601
§ 371 (c)(1),
(2) Date: Oct. 7, 2016

(87) PCT Pub. No.: WO2017/026023
PCT Pub. Date: Feb. 16, 2017

(65) Prior Publication Data
US 2018/0141583 A1   May 24, 2018

(51) Int. Cl.
*H02K 5/22* (2006.01)
*H02K 11/00* (2016.01)
*H02K 5/02* (2006.01)
*B62D 5/04* (2006.01)
*H02K 11/33* (2016.01)

(52) U.S. Cl.
CPC ............ *B62D 5/0406* (2013.01); *H02K 5/02* (2013.01); *H02K 5/225* (2013.01); *H02K 11/33* (2016.01)

(58) Field of Classification Search
CPC ............ H02K 5/22; H02K 5/02; H02K 5/225; H02K 11/33; B62D 5/0406

USPC ......................................................... 310/71
See application file for complete search history.

(56) References Cited

U.S. PATENT DOCUMENTS

| | | | |
|---|---|---|---|
| 5,493,085 A | 2/1996 | Kolberg et al. | |
| 6,989,616 B2* | 1/2006 | Okubo | H02K 11/01 180/443 |
| 7,021,418 B2* | 4/2006 | Tominaga | B62D 5/0406 180/444 |

(Continued)

FOREIGN PATENT DOCUMENTS

| EP | 1920992 A1 | 5/2008 |
|---|---|---|
| EP | 2147846 A1 | 1/2010 |

(Continued)

OTHER PUBLICATIONS

Communication dated Dec. 11, 2017, from the European Patent Office in counterpart European Application No. 15891405.1.

(Continued)

*Primary Examiner* — Burton S Mullins
(74) *Attorney, Agent, or Firm* — Sughrue Mion, PLLC

(57) ABSTRACT

A brushless motor that is smaller in appearance configuration, lighter, and easy to manufacture, and has a terminal connecting mechanism with an integral structure including mounting of a motor bus bar and an ECU terminal, and an electric power steering apparatus and a vehicle equipped therewith. The brushless motor includes a nut-integrated terminal connecting mechanism for inserting a motor bus bar terminal and an ECU terminal for connecting with a bolt and nut.

7 Claims, 17 Drawing Sheets

(56) References Cited

U.S. PATENT DOCUMENTS

| | | | | |
|---|---|---|---|---|
| 7,183,681 | B2* | 2/2007 | Segawa | B62D 5/0403 310/68 B |
| 7,488,184 | B2* | 2/2009 | Yasuda | H01R 13/405 439/76.1 |
| 7,831,355 | B2* | 11/2010 | Nishiyama | B62D 5/0472 180/410 |
| 7,989,997 | B2* | 8/2011 | Hashimoto | B62D 5/0406 310/68 D |
| 8,585,421 | B2* | 11/2013 | Yamaguchi | H01R 13/05 439/248 |
| 8,786,149 | B2* | 7/2014 | Yamashita | B62D 5/0406 310/416 |
| 8,919,489 | B2* | 12/2014 | Tsunoda | B62D 5/0406 180/443 |
| 9,124,160 | B2* | 9/2015 | Suga | H02K 11/33 |
| 2005/0167183 | A1 | 8/2005 | Tominaga et al. | |
| 2009/0183940 | A1* | 7/2009 | Sekine | B62D 5/0406 180/443 |
| 2009/0267430 | A1* | 10/2009 | Imamura | B62D 5/0406 310/71 |
| 2009/0285703 | A1* | 11/2009 | Osaka | F04C 18/0215 417/410.1 |
| 2013/0257337 | A1 | 10/2013 | Ochiai et al. | |

FOREIGN PATENT DOCUMENTS

| | | |
|---|---|---|
| JP | 62-144070 U | 9/1987 |
| JP | 2003-204654 A | 7/2003 |
| JP | 2004-056924 A | 2/2004 |
| JP | 2007-161158 A | 6/2007 |
| JP | 2008-160988 A | 7/2008 |
| JP | 2008-211945 A | 9/2008 |
| JP | 2008-220061 A | 9/2008 |
| JP | 2009-126350 A | 6/2009 |
| JP | 2009-132174 A | 6/2009 |
| JP | 2011-168169 A | 9/2011 |
| JP | 2011-250645 A | 12/2011 |
| WO | 2011/114554 A1 | 9/2011 |
| WO | 2012/073412 A1 | 6/2012 |

OTHER PUBLICATIONS

Office Action issued in corresponding Japanese Application No. JP 2014-116864 dated May 24, 2016.

Decision to Grant a Patent in corresponding application JP 2014-116864 dated Jul. 26, 2016.

* cited by examiner

PRIOR ART

PRIOR ART

PRIOR ART

FIG.17
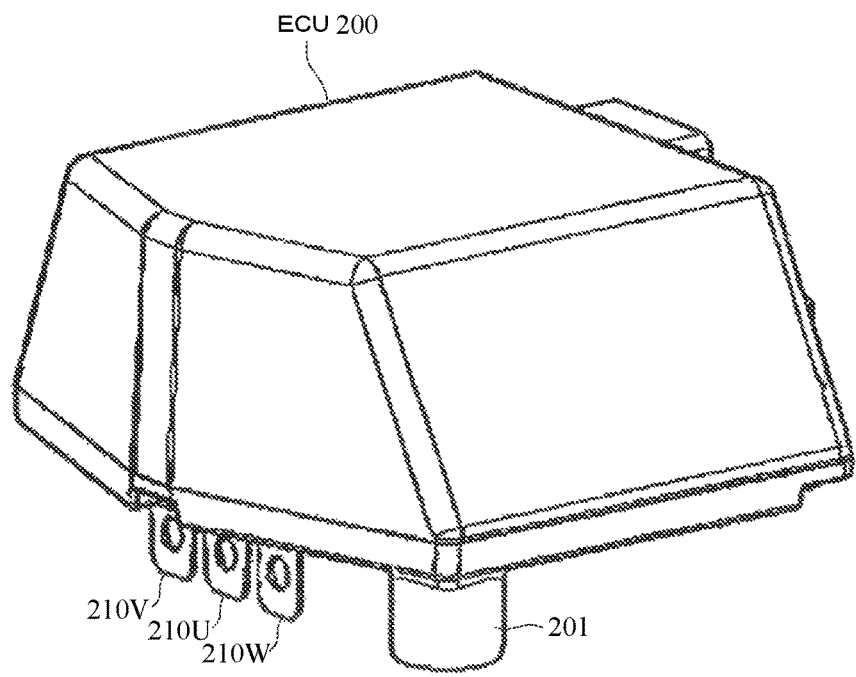
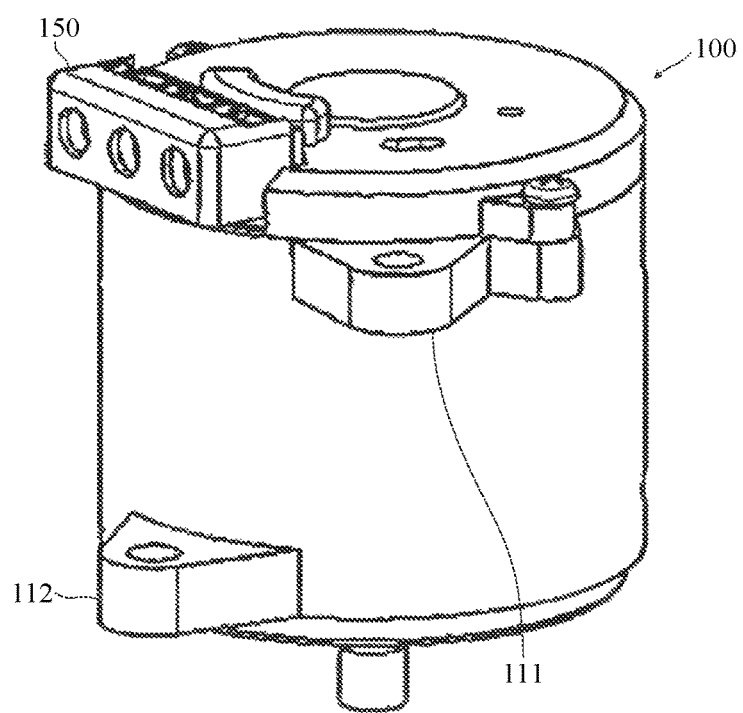

FIG.18
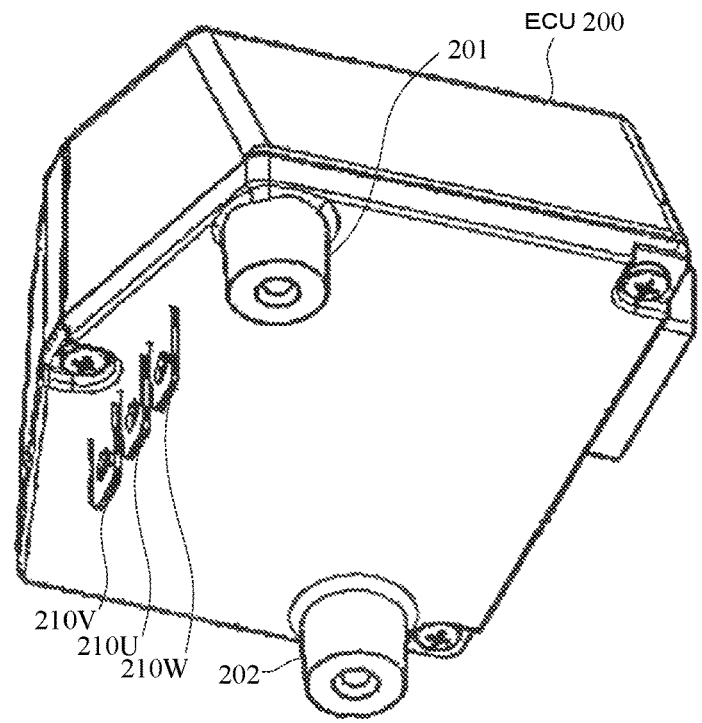
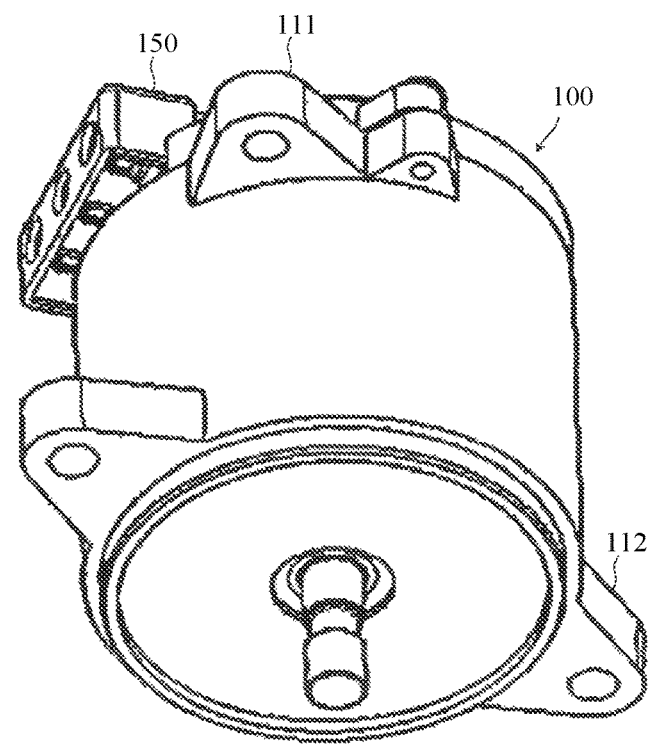

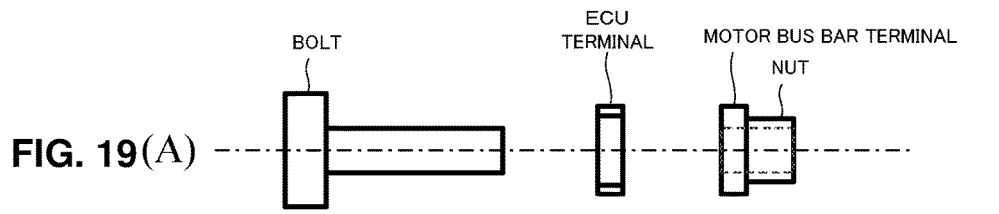
FIG. 19(A)
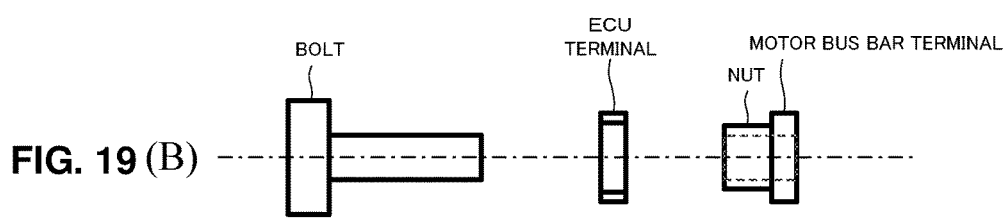
FIG. 19(B)
FIG.20
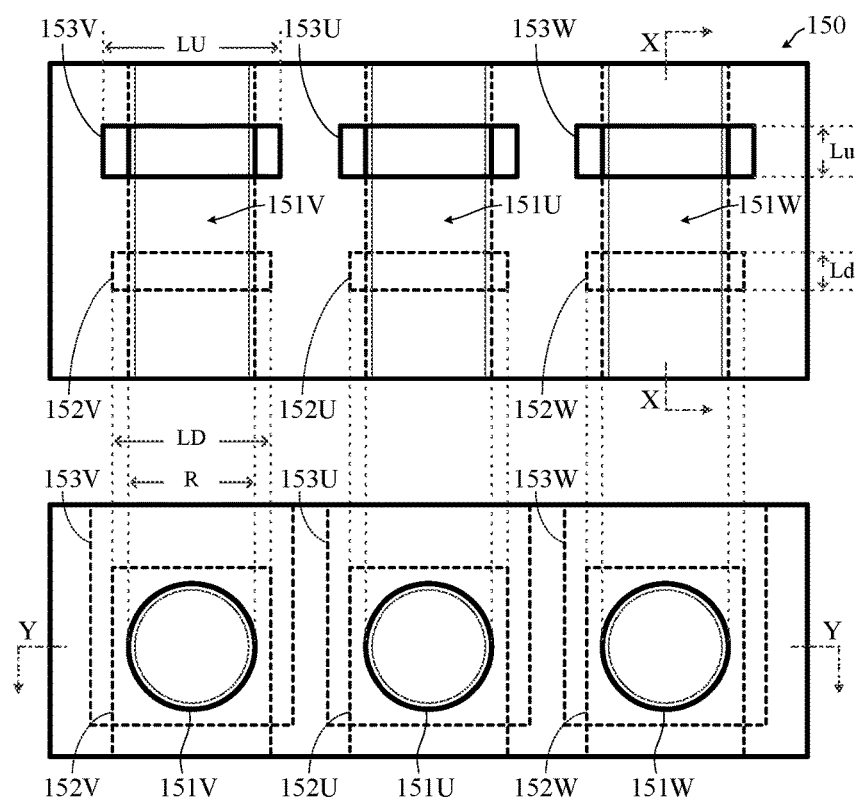

BRUSHLESS MOTOR, AND ELECTRIC POWER STEERING APPARATUS AND VEHICLE EQUIPPED WITH THE SAME

CROSS REFERENCE TO RELATED APPLICATIONS

This application is a National Stage of International Application No. PCT/JP2015/072601 filed Aug. 10, 2015, the contents of which is incorporated herein by reference in its entirety.

TECHNICAL FIELD

The present invention relates to a brushless motor with a nut-integrated terminal connecting mechanism for inserting and connecting a motor bus bar terminal and an ECU terminal, and an electric power steering apparatus and a vehicle equipped therewith. The electric power steering apparatus installed in the vehicle is intended to apply an assist force by a motor (for example, brushless motor) to a steering system of the vehicle by a current command value calculated based on at least a steering torque and is drive-controlled by an inverter comprising a bridge circuit.

BACKGROUND ART

As an apparatus equipped with a brushless motor in a driving section, there is an electric power steering apparatus (EPS). The electric power steering apparatus is intended to apply a steering assist force (assist force) to a steering mechanism of a vehicle by a rotational force of a motor, and applies a steering assist force to a steering shaft or a rack shaft through a transmission mechanism such as gears with a driving force of a motor controlled by an electric power supplied from an inverter. Such the electric power steering apparatus in the related art accurately generates a torque of a steering assist force, and thus carries out a feedback control of a motor current. The feedback control is intended to adjust a voltage applied to the motor to reduce a difference between a steering assist command value (current command value) and a motor current detected value. Adjustment of the voltage applied to the motor is generally made by a duty adjustment in a pulse-width modulation (PWM) control, and as the motor, a brushless motor is typically used, which is superior in durability and maintainability and produces less undesired sound and noise.

To illustrate and describe a general configuration of the electric power steering apparatus in FIG. 1, a column shaft (steering shaft, handle) 2 of a steering wheel 1 is coupled to steered wheels 8L and 8R through reduction gears 3 in a reduction section, universal joints 4a and 4b, a pinion rack mechanism 5, tie rods 6a and 6b, and further through hub units 7a and 7b. The column shaft 2 is provided with a torque sensor 10 that detects a steering torque Th of the steering wheel 1 and a steering angle sensor 14 that detects a steering angle θ, and a motor 20 that assists a steering force of the steering wheel 1 is coupled to the column shaft 2 through the reduction gears 3. Power is supplied from a battery 13 to a control unit (ECU) 30 that controls the electric power steering apparatus, and at the same time, an ignition key signal is inputted into the control unit 30 through an ignition key 11. The control unit 30 calculates a current command value of an assist (steering assist) command based on the steering torque Th detected by the torque sensor 10 and a vehicle speed Vel detected by a vehicle speed sensor 12, and controls current supplied to the motor 20 for the EPS by a voltage control command value Vref with, for example, compensation made for the current command value.

The steering angle sensor 14 is not necessarily required and may not be disposed. The steering angle can also be obtained from a rotational sensor such as a resolver connected to the motor 20.

A Controller Area Network (CAN) 40 that sends or receives a variety of information on the vehicle is connected to the control unit 30, and the vehicle speed Vel can be received from the CAN 40 as well. The control unit 30 has also a Non-CAN 41 connected, which sends or recieves, for example, communications, analogue/digital signals, and radio waves other than the CAN 40.

An exemplary power transmission mechanism of the motor 20 of the electric power steering apparatus and an exemplary connection of the motor 20 with the control unit (ECU) 30 are as illustrated in FIG. 2.

As illustrated in FIG. 2, an output shaft 21 of the motor 20 is extended toward outside of a motor housing 22. The motor housing 22 that forms a motor yoke includes a bottomed, substantially cylindrical case body 23 that houses a motor body including a rotor, for example, and a motor mounting section 24 mounted on an opening side of the case body 23. The motor mounting section 24 is formed into a sheet as a whole, and via a through-hole in a central portion thereof, the output shaft 21 is inserted outside the motor mounting section 24. The motor mounting section 24 may be formed by a flange.

A power transmission mechanism 50 has a worm reduction mechanism comprising a worm 51 and a worm wheel 52 and further includes a connecting portion 53 that connects the worm reduction mechanism and the output shaft 21. The worm 51 is formed in a middle part of a worm shaft 51A that is coaxial with the output shaft 21, and is engaged with the worm wheel 52. An upper (steering wheel) side output shaft 2A of the column shaft 2 that integrally rotates with the worm wheel 52 is connected to a shaft center of the worm wheel 52. By the worm reduction mechanism, the rotation of the motor 20, that is, the rotation of the output shaft 21 is reduced and transmitted to the upper side output shaft 2A.

An internal space of a motor mounting section 54 on a side of the reduction mechanism is formed into a trumpet shape so as to expand on a side of the motor 20 (opening side), and an opening of the motor mounting section 54 is closed by bolting the motor mounting section 54 to the motor mounting section 24 on the side of the motor 20. In a condition illustrated in FIG. 2 where the motor 20 is mounted on the motor mounting section 54, the connecting portion 53 and the output shaft 21 are positioned at a shaft center of the internal space of the motor mounting section 54. Ina case where the motor mounting section 24 is formed by a flange, the motor mounting section 54 is, in response to this, formed by a flange as well.

The motor 20, and the control unit (ECU) 30 or an ECU substrate are separated from each other and wired by a lead wire 31, and the motor 20 is drive-controlled by the control unit (ECU) 30 through the lead wire 31.

In this type of the electric power steering apparatus, it is requested to reduce an overall weight and size including the motor, and it is also strongly desired to improve assemblability and axial precision of the motor.

A motor housing that can reduce part assembly work while maintaining insulation among power supply members and simplifies a power supply structure from an external power source to a motor is disclosed in, for example, Japanese Published Unexamined Paten Application No.2008-160988 A (Patent Document 1). A motor insulating housing 60 disclosed in Patent Document 1 is, as illustrated in FIGS. 3 and 4, integrally formed with a housing body 65 by an insert-molding with power supply members 61 to 64 insulated, laminated, and arranged at a distance from one another in a through-thickness direction. It is disclosed that a power connector 66 that has supply terminals 61A to 63A of the power supply members 61 to 63 as connector terminals is integrally molded with the housing body 65. The power supply members 61 to 64 each are provided with a coil terminal 67 protruding outward.

THE LIST OF PRIOR ART DOCUMENTS

Patent Documents

Patent Document 1: Japanese Published Unexamined Paten Application No.2008-160988 A
Patent Document 2: Japanese Published Unexamined Paten Application No.2008-220061 A

SUMMARY OF THE INVENTION

Problems to be Solved by the Invention

However, in the motor insulating housing in Patent Document 1, the housing body is provided only with the power connector as the connector terminal, and the connectivity with external devices such as the ECU has not been considered. Downsizing of the entire motor, and improvement of the assemblability and the axial precision have not at all been solved.

On the other hand, a motor apparatus with a control unit easy to mount and change and without a load or a mounting load of the control unit applied to a connector terminal is disclosed in, for example, Japanese Published Unexamined Paten Application No. 2008-220061 A (Patent Document 2). That is, as illustrated in FIG. 5, on a motor housing 71 of a motor 70 and a housing 81 of a control unit 80, a guiding engaging section 72 and a guided engaging section 82, which are mutually inserted and guided in one direction and prevent movements in insertion and orthogonal directions, are formed, respectively. By supporting the control unit housing 81 and the motor housing 71 in the direction perpendicular to an insertion and guiding direction or leading them to a joining and facing position, a sensor connector 83 and a sensor circuit connector 73, and a circuit side motor winding terminal 84 and a motor side motor winding terminal 74 are electrically connected, and the motor housing 71 and the control unit housing 81 are integrally fixed by a method such as screwing.

However, the motor apparatus in Patent Document 2 has a motor bus bar and a control unit connecting terminal non-integrated with each other, and has a large appearance configuration. Further downsizing and simplification with external devices such as the ECU connected is desired.

The present invention has been made in view of the above situations, and an object thereof is to provide a brushless motor that is smaller in appearance configuration, lighter, and easy to manufacture, and has a terminal connecting mechanism with an integral structure including mounting of a motor bus bar and an ECU terminal, and an electric power steering apparatus and a vehicle equipped therewith.

Means for Solving the Problems

The present invention relates to a brushless motor, the above-described object of the present invention is achieved by that comprising a nut-integrated terminal connecting mechanism for inserting a motor bus bar terminal and an ECU terminal for connecting with a bolt and nut.

The above-described object of the present invention is more effectively achieved by that wherein the terminal connecting mechanism is provided with a bracket holder built-in on a side surface of a motor cover, and has a constitution being capable of mounting and removing a terminal cover; or wherein the motor bus bar terminal and the ECU terminal are integrated with each other by inserting a bolt; or wherein the motor bus bar terminal and the ECU terminal are provided with a screw hole or a circular hole that is engaged with the bolt; or wherein the terminal connecting mechanism has a first elongated-shape slit for inserting the motor bus bar terminal and a second elongated-shape slit for inserting the ECU terminal, and the first elongated-shape slit and the second elongated-shape slit face opposite directions; or wherein the first and second slits are respectively elongate holes with a degree of freedom in a motor axial direction, wide with a degree of freedom in a motor radial direction, and capable of absorbing variations in terminal size; or wherein the motor cover is made of aluminum, zinc alloy, magnesium alloy, or sheet metal, and a rotor bearing is held by mounting of the motor cover.

An electric power steering apparatus that is drive-controlled by the brushless motor, and applies an assist force to a steering system of a vehicle by a current command value calculated based on at least a steering torque and a vehicle equipped with the electric power steering apparatus, are achieved.

Effects of the Invention

A brushless motor according to an embodiment of the present invention includes a motor housing made of aluminum, zinc alloy, or magnesium alloy, and has a nut-integrated terminal connecting mechanism for inserting and connecting a motor bus bar terminal and an ECU terminal with a bolt and nut. Therefore, it is possible to reduce weight and size, improve assemblability, and connect easily and surely to external devices such as an ECU.

By applying the above brushless motor to an electric powersteeringapparatus,alighter,compact,andhighlyreliable electric power steering apparatus can be achieved, and by installing such the electric power steering apparatus in a vehicle, it is possible to reduce a weight of the vehicle.

BRIEF DESCRIPTION OF THE DRAWINGS

In the accompanying drawings.

FIG. 17 is an upward perspective view illustrating how an ECU is mounted on a brushless motor according to an embodiment of the present invention;

FIG. 18 is a downward perspective view illustrating how an ECU is mounted on a brushless motor according to an embodiment of the present invention;

FIGS. 19(A) and 19(B) are structure views illustrating an exemplary connection of an ECU terminal and a motor bus bar terminal;

FIG. 20 is a plane and front view illustrating an exemplary structure of a terminal connecting mechanism according to an embodiment of the present invention;

MODE FOR CARRYING OUT THE INVENTION

A brushless motor according to an embodiment of the present invention comprises a motor housing made of aluminum, zinc alloy, or magnesium alloy, and includes, on a side surface of a motor cover, a nut-integrated terminal connecting mechanism for inserting and connecting a motor bus bar terminal and an ECU terminal with a bolt and nut. Thus, it is possible to reduce weight and size of the motor, improve assemblability, and connect easily and surely to external devices such as an ECU.

Embodiments of the present invention will be described below with reference to the drawings. Aluminum die-casting will be described below, but zinc alloy die-casting and magnesium alloy die-casting are similarly applicable.

Figure 1:
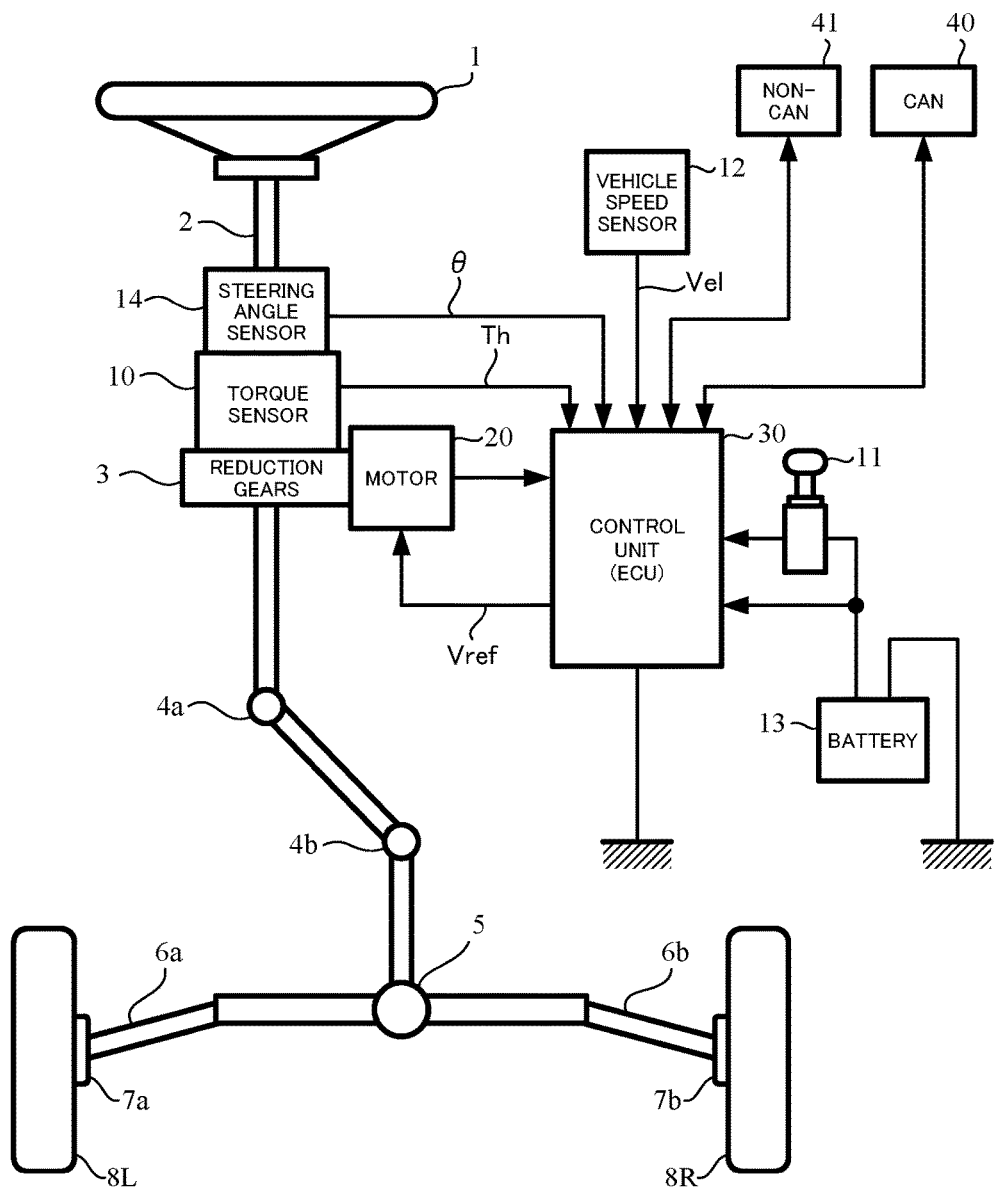
FIG. 1 is a schematic configuration view of an electric power steering apparatus.
Figure 2:
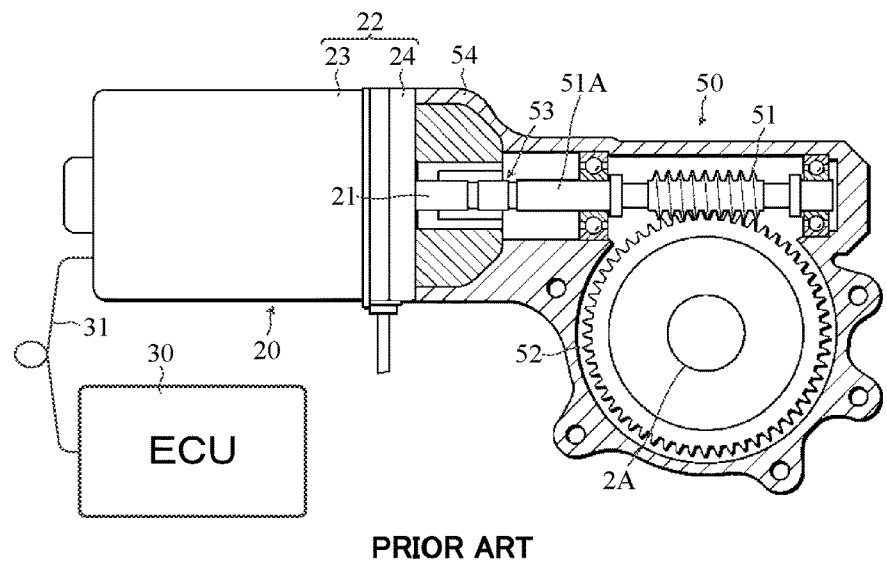
FIG. 2 is a diagram illustrating an exemplary connecting mechanism between a motor and a reduction section of an electric power steering apparatus, and an exemplary connection to a control unit (ECU)
Figure 3:
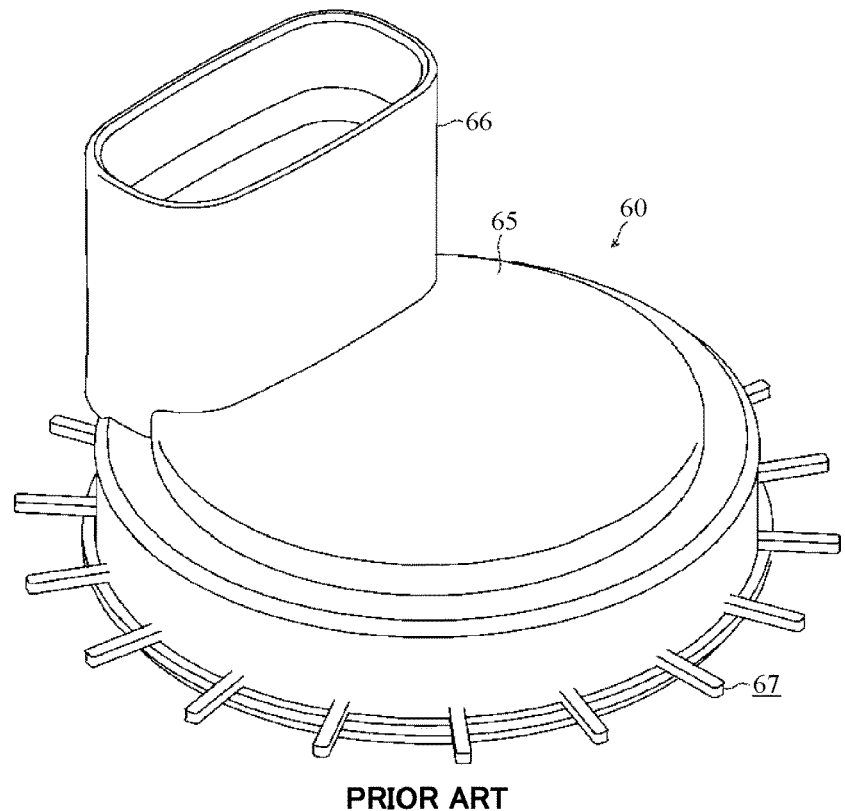
FIG. 3 is a perspective diagram illustrating an exemplary motor insulating housing in the related art.
Figure 4:
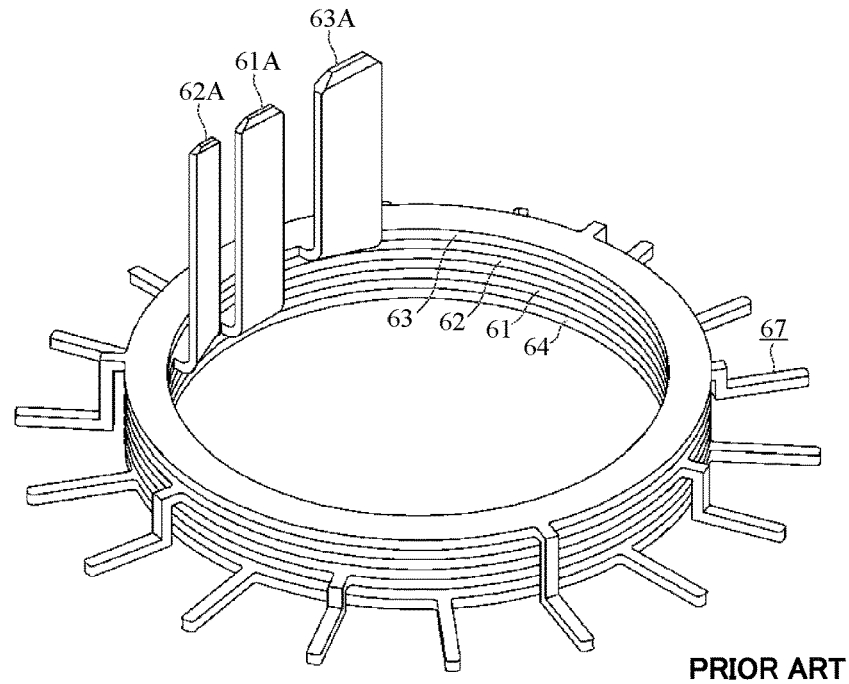
FIG. 4 is a perspective diagram illustrating a configuration of power supply members.
Figure 5:
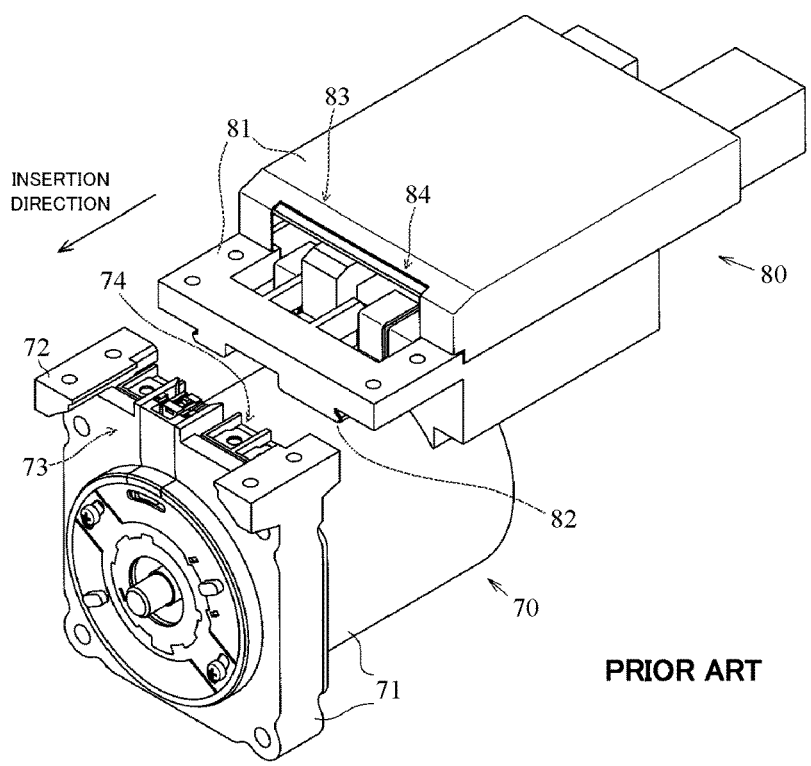
FIG. 5 is a perspective view illustrating an exemplary structure of a motor device in the related art.
Figure 6:
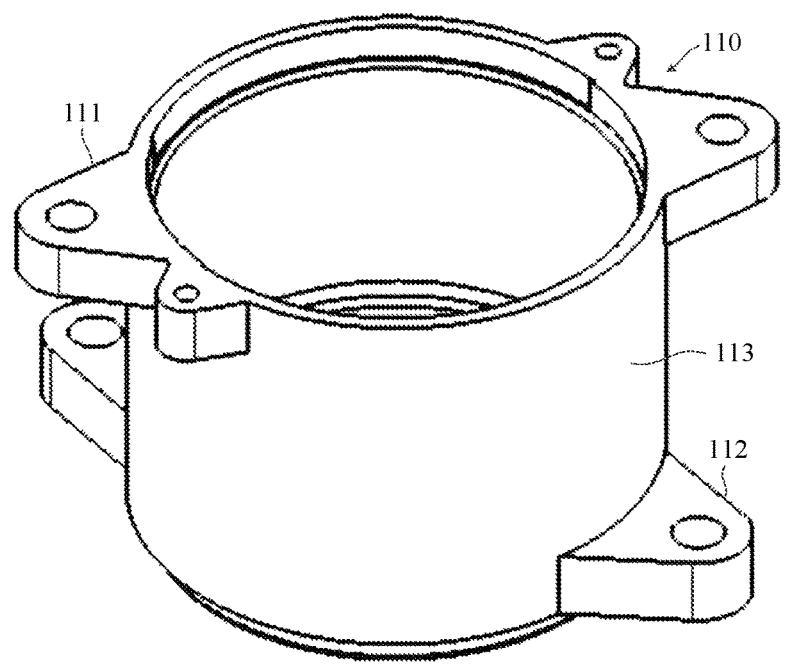
FIG. 6 is a perspective view illustrating an exemplary structure of a motor housing according to an embodiment of the present invention.

FIG. 6 illustrates a structure of a motor housing 110 of a brushless motor 100 according to an embodiment of the present invention. A housing body 113 is in a cylindrical shape, and a bottom section has a planar structure including an opening in a central portion for a motor output shaft to protrude and doubles as a motor front cover (end plate). At an upper end (on the drawing) of the housing body 113, an ECU mounting flange 111 is provided protruding outward, and at a lower end (on the drawing) of the housing body 113, a motor mounting flange 112 is integrally provided protruding outward. The motor housing 110 is casted and molded integrally with the ECU mounting flange 111 and the motor mounting flange 112 by aluminum die-casting.

Figure 7:
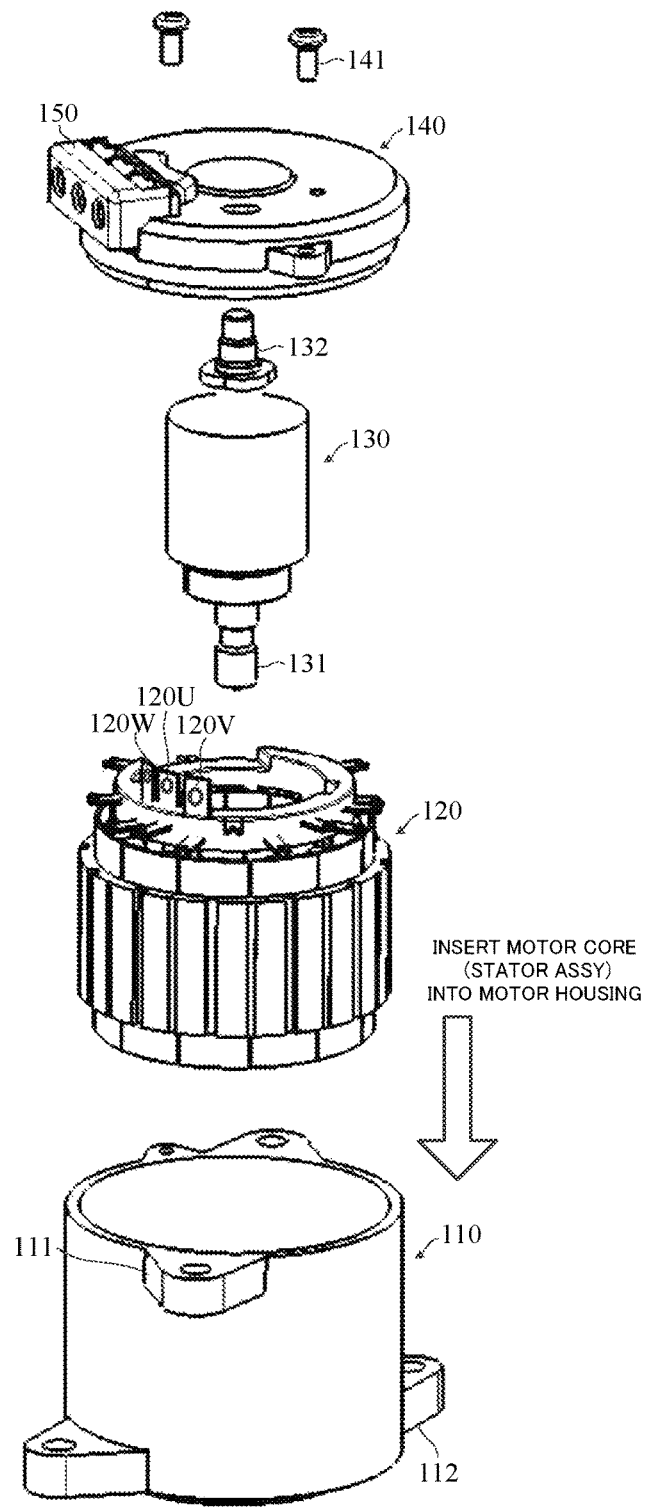
FIG. 7 is an assembly development view of a brushless motor according to an embodiment of the present invention.

On this type of the motor housing 110, motor internal parts are, as illustrated in Fig.7, built in by press fitting or shrink fitting from one direction for assembling the brushless motor 100. That is, firstly a stator assembly (ASSY) 120 is inserted into the motor housing 110 for press fitting or shrink fitting. Next, a rotor assembly (ASSY) 130 is inserted into the stator assembly 120 fixed on the motor housing 110 for press fitting or shrink fitting. Finally, a motor cover 140 made of aluminum or sheet metal is mounted and fixed on the stator assembly 120 with a screw 141, for example. The stator assembly 120 and the motor cover 140 are each provided with bearings (121, 142), and rotate while holding shafts (131, 132) of the rotor assembly 130.

Figure 8:
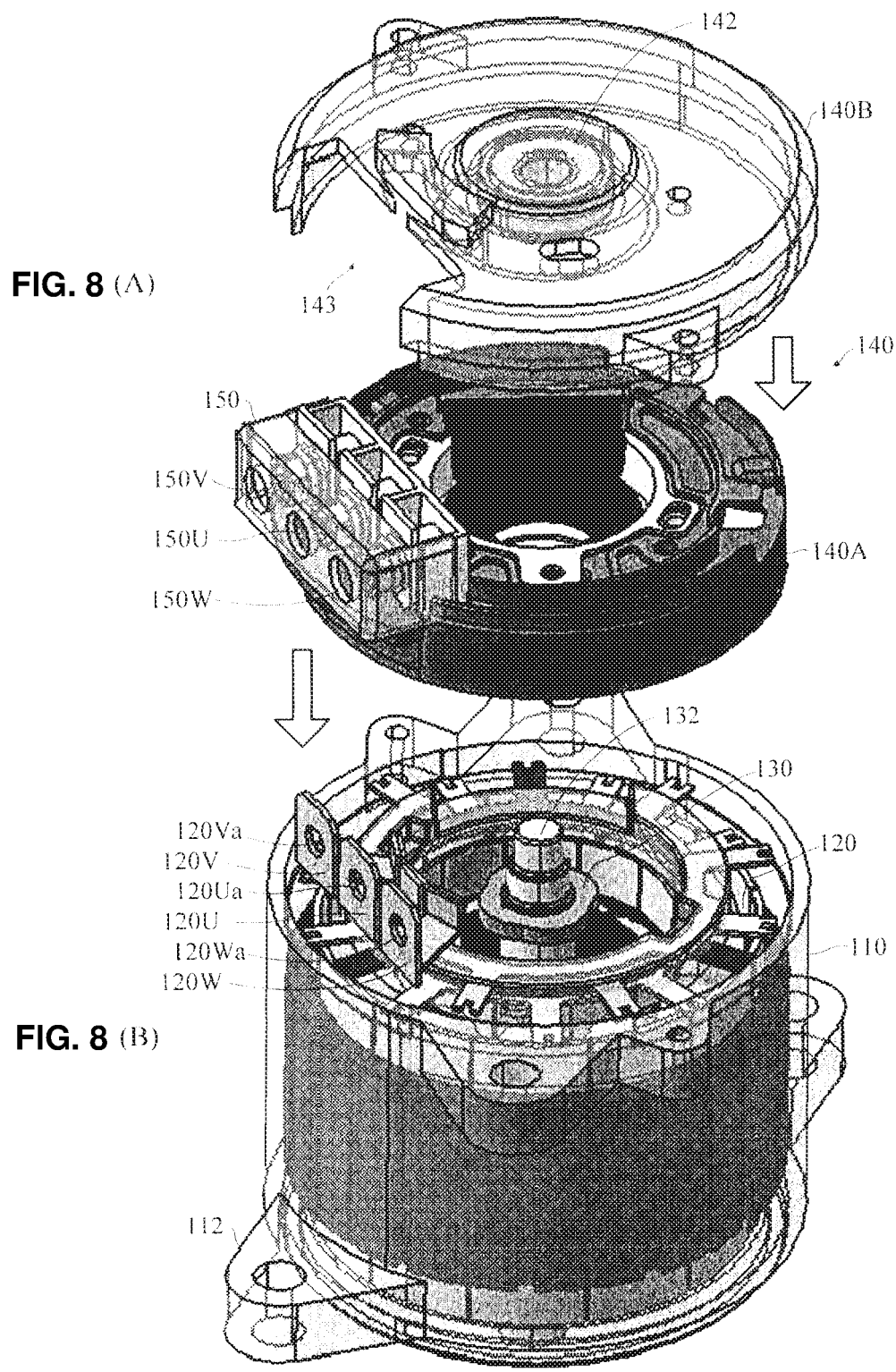
FIGS. 8(A) and 8(B) are assembly development views illustrating stator and rotor assemblies built in a motor housing of a brushless motor according to an embodiment of the present invention, and an exemplary detailed structure of a motor cover.

FIG. 8(B) illustrates the stator assembly 120 and the rotor assembly 130 built in the motor housing 110, and FIG. 8(A) illustrates details of the motor cover 140. The motor cover 140 comprises a disk-shaped cover body 140A with a terminal connecting mechanism 150 on a side surface (periphery) and a lid member 140B with the bearing 142 in a central portion and a cut-notch 143 in an elongated shape in a periphery. Once a cover member 140B is mounted on the cover body 140A, the terminal connecting mechanism 150 protrudes just from a cut-notch 143, and a structure of the motor cover 140 as illustrated in FIG. 7 is formed.

On an upper surface section (on the drawing) of the stator assembly 120, motor bus bar terminals in strips 120U, 120V and 120W serving as winding terminals of a motor coil are vertically installed facing upward. The motor bus bar terminals 120U, 120V and 120W each are integrally provided with nuts (screw holes 120Ua, 120Va and 120Wa) threadedly engaged with bolts. In the periphery of the cover body 140A of the motor cover 140, the terminal connecting mechanism 150 including a cuboid insulator (bracket holder) connected to the motor bus bar terminals 120U, 120V and 120W as well as to the external ECU terminals (210U, 210V, 210W) is provided.

Figure 9:
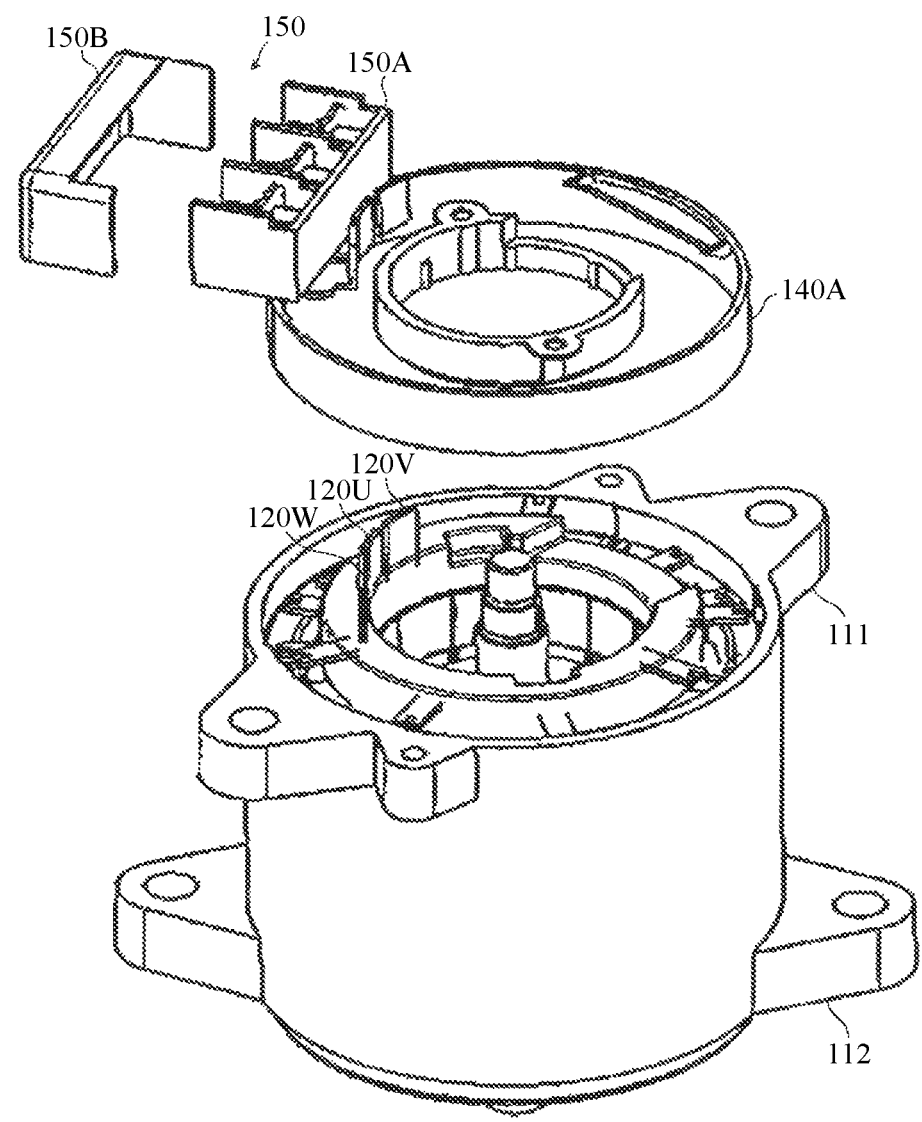
FIG. 9 is an assembly development view illustrating how a cover body and a terminal connecting mechanism are mounted on a motor body.

FIG. 9 is an assembly development view illustrating how the cover body 140A and the terminal connecting mechanism 150 are mounted on the motor body with the stator assembly 120 and the rotor assembly 130 built in the motor housing 110. The cover body 140A has the bracket holder integrally connected, and a terminal cover 150B can be mounted and removed. On aside surface of the terminal cover 150B, there are circular holes or screw holes for bolts to pass through.

Figure 10:
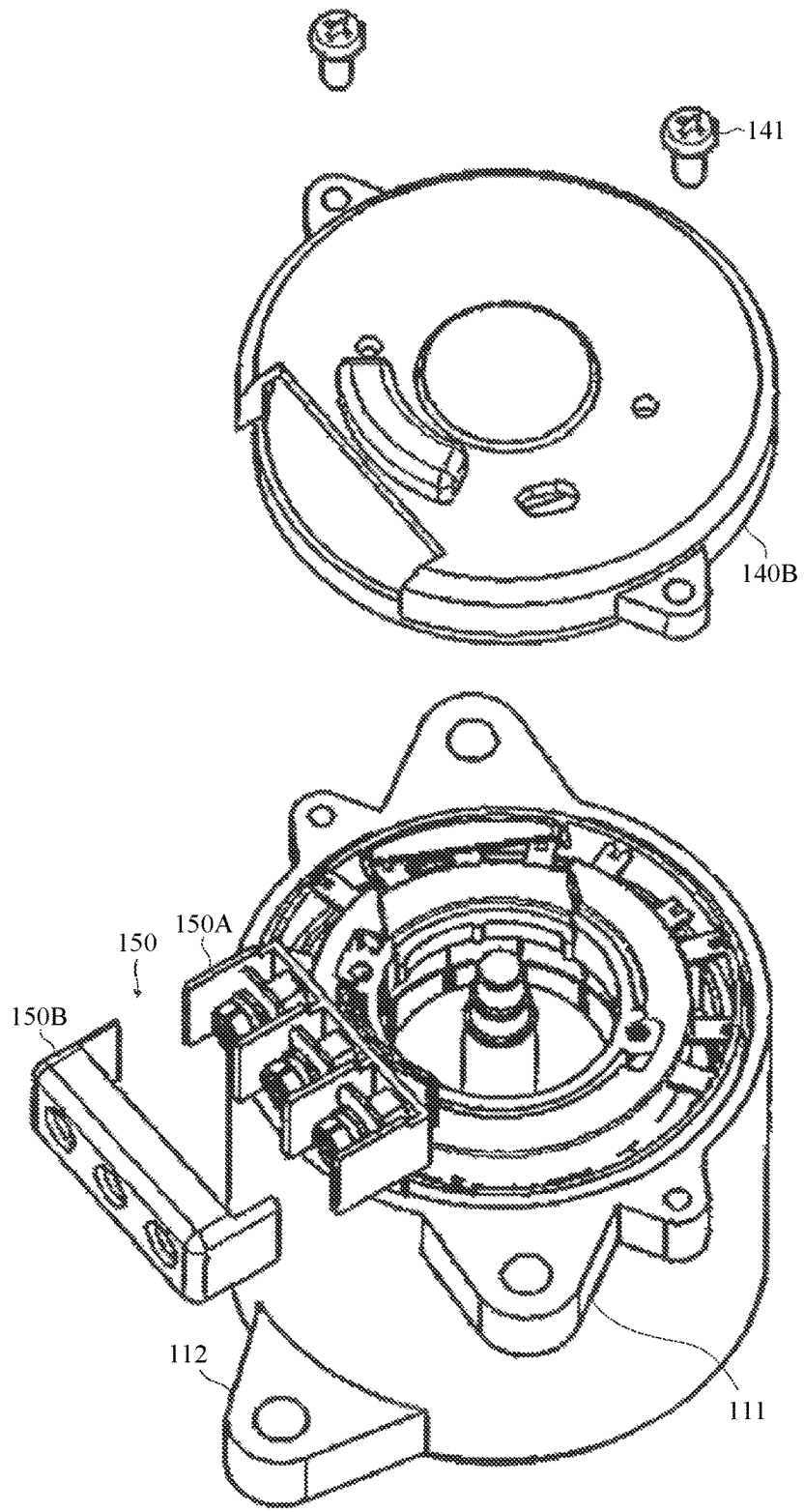
FIG. 10 is an assembly development view illustrating how a lid member is mounted on a motor body with a cover body mounted.
Figure 11:
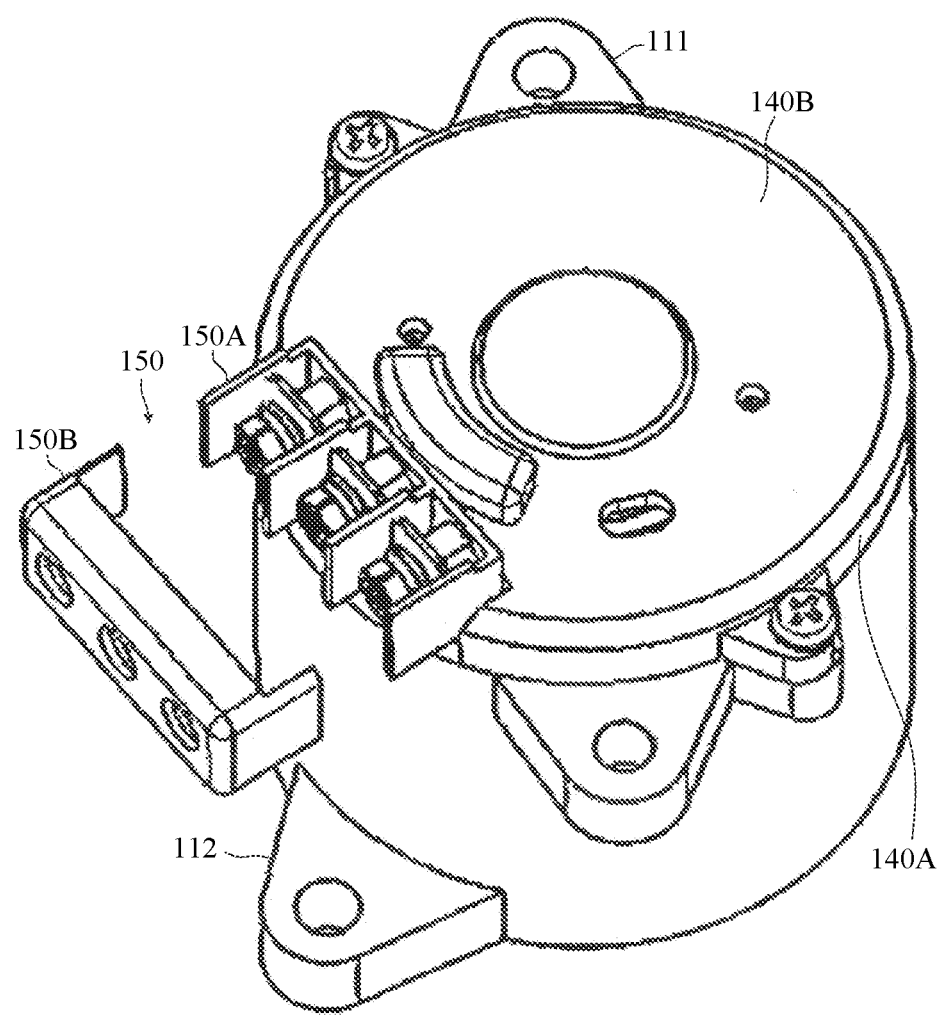
FIG. 11 is an assembly development view illustrating how a terminal cover is mounted on a motor body.
Figure 12:
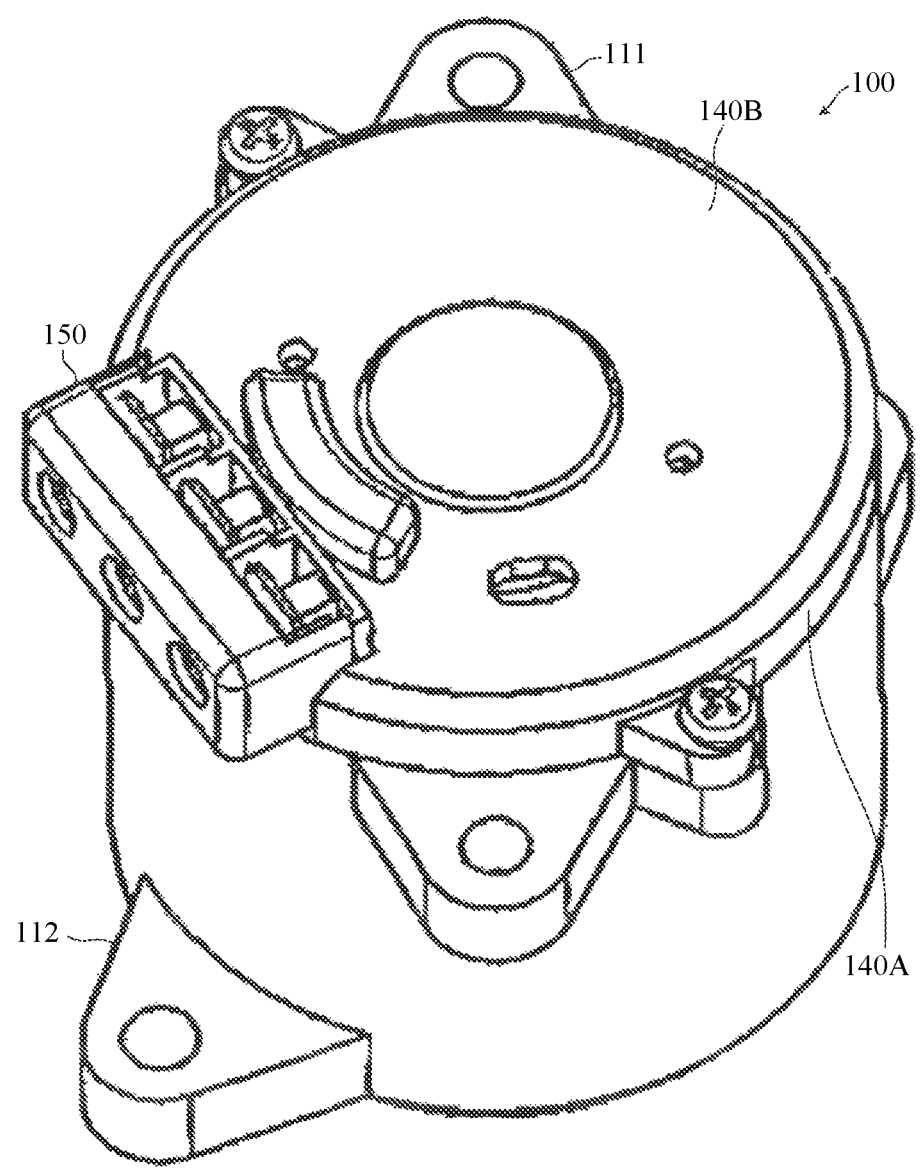
FIG. 12 is an external perspective view of a brushless motor according to an embodiment of the present invention.

FIG. 10 is an assembly development view illustrating how the cover member 140B is mounted on the motor body with the cover body 140A mounted. The cover member 140B is mounted with the screw 141. FIG. 11 illustrates how the terminal cover 150B is mounted on the terminal connecting mechanism 150 of the motor body. FIG. 12 is an external perspective view of the brushless motor 100 according to an embodiment of the present invention, with the terminal cover 150 mounted.

Figure 13:
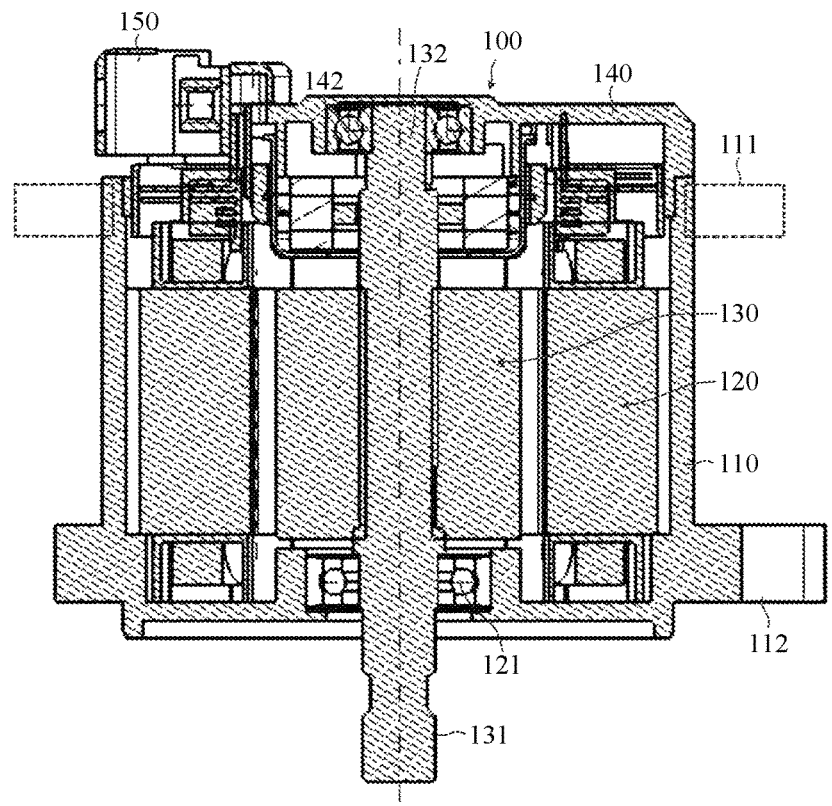
FIG. 13 is a cross-section structure view of a brushless motor according to an embodiment of the present invention.

By this type of assembly process, the brushless motor 100 whose cross-section structure is illustrated in FIG. 13 can be obtained with a structure where the terminal connecting mechanism 150 protrudes outward. The motor output shaft 131 protrudes from an opening of a bottom surface (front cover) of the motor housing 110. The shafts 131 and 132 of the rotor assembly 130 are held by the bearings 142 and 121, respectively and are rotatable.

Figure 14:
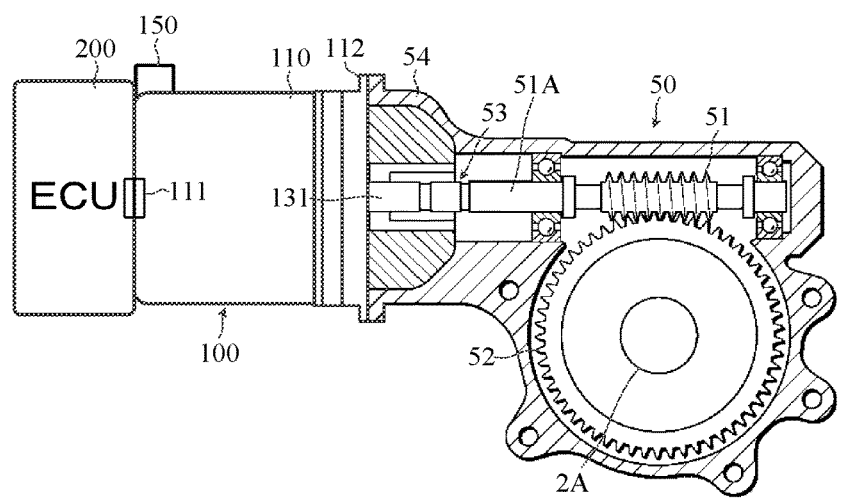
FIG. 14 is a view illustrating an exemplary connecting mechanism between a motor and a reduction section of an electric power steering apparatus, and an exemplary connection to a control unit (ECU)

The brushless motor 100 according to an embodiment of the present invention has a configuration as illustrated in FIG. 14, and is mounted on the reduction section (gearbox) through the motor mounting flange 112, and an ECU 200 is mounted on the brushless motor 100 through the ECU mounting flange 111. Mounting through the flanges 111 and 112 maybe carried out with a bolt, a nut, or a screw.

Figure 15A:
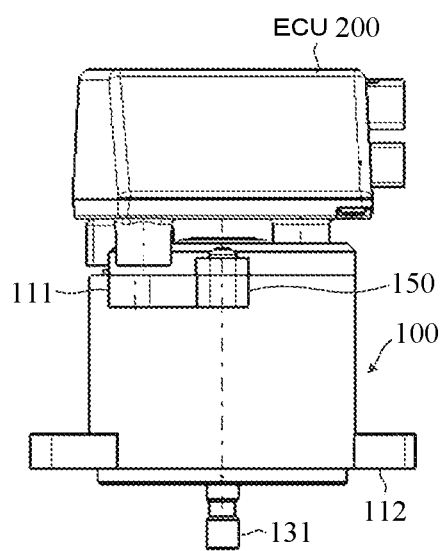
FIGS. 15(A) and 15(B) are front and side views illustrating an ECU mounted on a brushless motor according to an embodiment of the present invention.
Figure 15B:
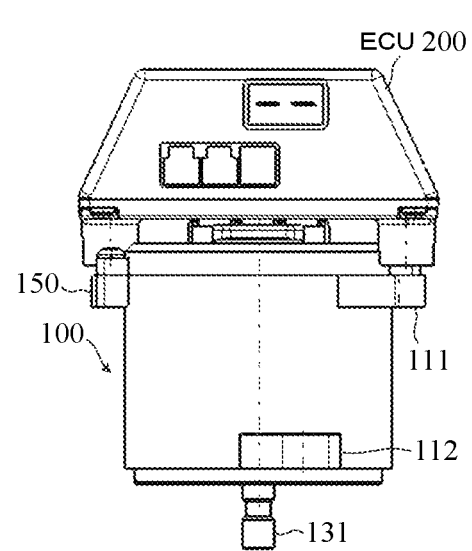

FIGS. 15(A) and 15(B) illustrate in front and side diagrams how the ECU 200 is mounted on the brushless motor 100. The ECU 200 is coupled to the ECU mounting flange 111 through terminal blocks 201 and 202 provided on a bottom surface side (on the drawing) of the ECU 200, and electrically connected by the terminal connecting mechanism 150.

Figure 16:
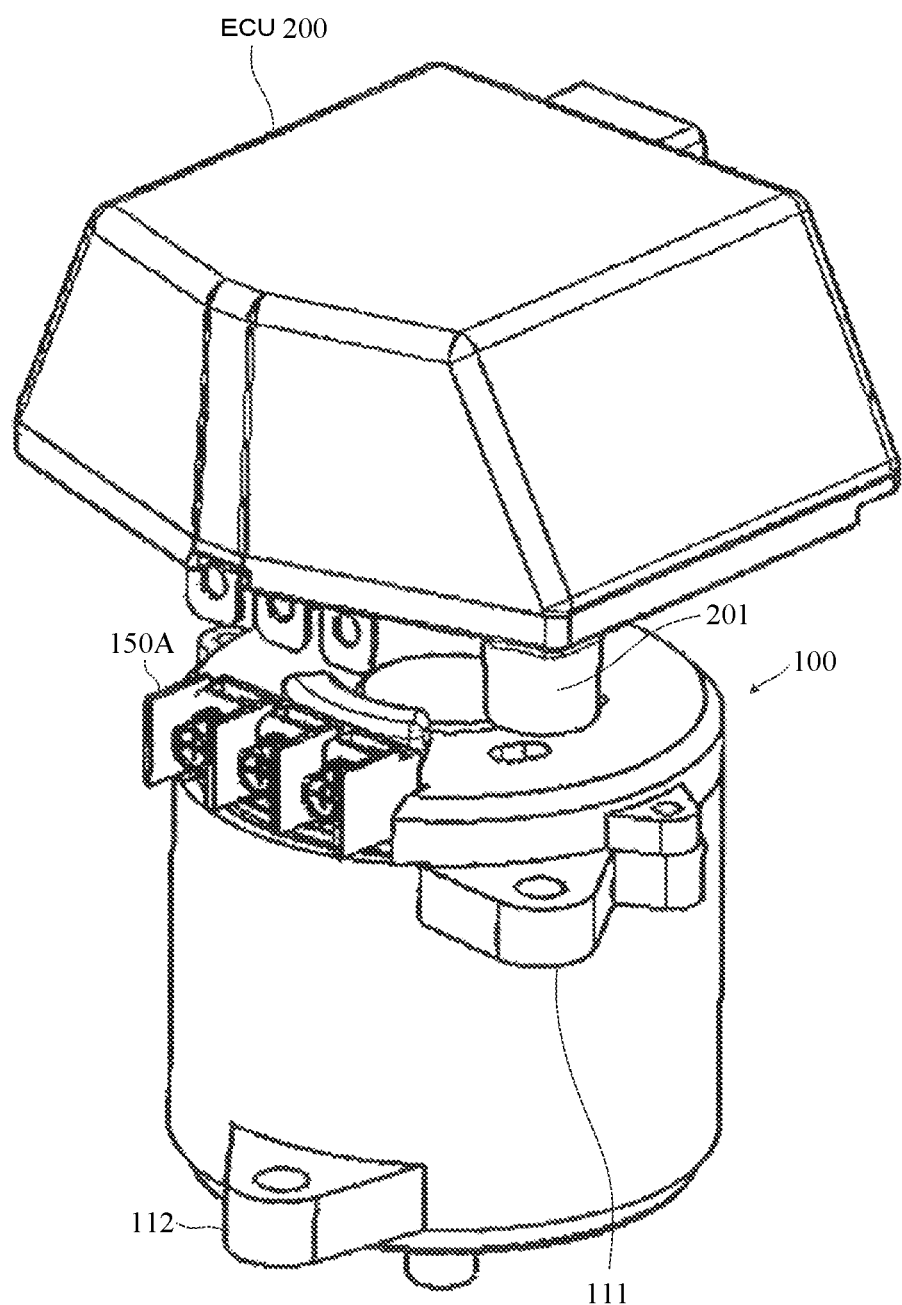
FIG. 16 is a perspective view illustrating how an ECU is mounted on a brushless motor (without a terminal cover) according to an embodiment of the present invention.

FIGS. 16 to 18 illustrate how the ECU 200 is mounted on the motor 100. At ends of the bottom surface of the ECU 200, the ECU terminals 210U, 210V and 210W and ECU mounting posts 201 and 202 are vertically installed. In mounting the ECU 200 on the motor 100, the ECU mounting posts 201 and 202 are engaged with engaging holes of the motor cover 140, and the ECU terminals 210U, 210V and 210W are inserted into predetermined positions of the terminal connecting mechanism 150 for engagement.

A connecting relation between the ECU terminals 210U, 210V and 210W and the motor bus bar terminals 120U, 120V and 120W is as illustrated in FIGS. 19(A) and 19(B). FIG. 19(A) is an example where the nuts are connected outside the motor bus bar terminals 120U, 120V and 120W, and FIG. 19(B) is an example where the nuts are connected inside the motor bus bar terminals 120U, 120V and 120W. In neither case, the motor bus bar terminals are connected with bolts made of conductive materials across the ECU terminals with screw holes or circular holes through nuts. As a result, the ECU terminals 210U, 210V and 210W and the motor bus bar terminals 120U, 120V and 120W are electrically and mechanically connected to each other.

Figure 21:
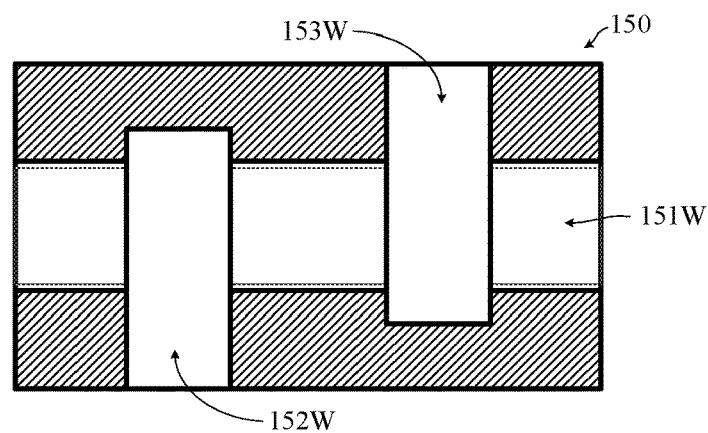
FIG. 21 is a sectional view illustrating connected terminals cut along a line X-X in FIG. 20.

Next, other examples of a structure of the terminal connecting mechanism 150 and connection of the terminals will be described in detail with reference to FIGS. 20 and 21.

The terminal connecting mechanism 150 is insulating and cuboid-shaped (bracket holder), and provided with identically shaped nut holes 151U (inner diameter R), 151V (inner diameter R) and 151W (inner diameter R) laterally threaded for three layers. The inner diameter R is the same as the inner diameter of the screw holes 120U$a$, 120V$a$ and 120W$a$ provided to the motor bus bar terminals 120U, 120V and 120W. Rectangular motor terminal engaging grooves 152U, 152V and 152W, which are each engaged with the motor bus bar terminals 120U, 120V and 120W inserted from below, and rectangular ECU terminal engaging grooves 153U, 153V and 153W, which are each engaged with the three-layer ECU terminals inserted from above, are provided so as to be perpendicular to the nut holes 151U, 151V and 151W, respectively, in a vertical direction. The motor terminal engaging grooves 152U, 152V and 152W have the same shape with a width of LD and a length of Ld. The ECU terminal engaging grooves 153U, 153V and 153W have the same shape with a width of LU and a length of Lu. Depths (heights) traverse the nut holes 151U, 151V and 151W.

The width LD and the length Ld of the motor terminal engaging grooves 152U, 152V and 152W each exceed the size of the motor bus bar terminals 120U, 120V and 120W so as to absorb variations in dimeter of the terminals. The width LU and the length Lu of the ECU terminal engaging grooves 153U, 153V and 153W each exceed the size of the ECU terminals 210U, 210V and 210W so as to absorb variations in dimeter of the terminals. Thus, it is possible to smoothly carry out both the engagement of the motor bus bar terminals 120U, 120V and 120W with the motor terminal engaging grooves 152U, 152V and 152W, respectively and the engagement of the ECU terminals 210U, 210V and 210W with the ECU terminal engaging grooves 153U, 153V and 153W, respectively.

Figure 22:
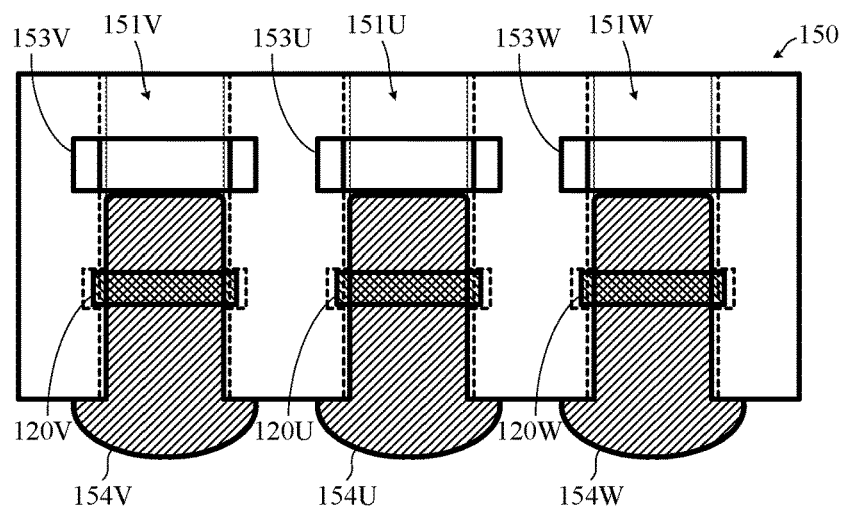
FIG. 22 is a sectional view illustrating a connecting structure of motor bus bar terminals to ECU terminals with bolts cut along a line Y-Y in FIG. 20.

The motor bus bar terminals 120U, 120V and 120W are inserted from below into the motor terminal engaging grooves 152U, 152V and 152W, respectively, and the ECU terminals 210U, 210V and 210W are inserted from above into the ECU terminal engaging grooves 153U, 153V and 153W, respectively. Then, as illustrated in FIG. 22, firstly the motor bus bar terminals 120U, 120V and 120W are threadedly engaged with bolts 154U, 154V and 154W made of conductive materials, respectively. The bolts are further fastened, and tips of the bolts 154U, 154V and 154W are brought into contact with the ECU terminals 210U, 210V and 210W, respectively, and fixed. Consequently, the ECU terminals 210U, 210V and 210W and the motor bus bar terminals 120U, 120V and 120W can be electrically connected and mechanically fixed, respectively. The ECU 200 and the brushless motor 100 can have a lightweight structure and be compactly integrated with each other.

In the above embodiment, the motor terminal engaging grooves 152U, 152V and 152W are provided on a near side of bolt insertion and the ECU terminal engaging grooves 153U, 153V and 153W are provided in a rear of bolt insertion, but the ECU terminal engaging grooves 153U, 153V and 153W may be provided on the near side and the motor terminal engaging grooves 152U, 152V and 152W may be provided in the rear. In this case, the ECU terminals 210U, 210V, and 210W each are provided with screw holes that threadedly engage with bolts.

In either embodiment, screw holes that threadedly engage with bolts are provided to the motor bus bar terminals 120U, 120V and 120W or the ECU terminals 210U, 210V and 210W, but it is possible to provide screw holes with identical inner diameters to both of them and to have bolts penetrate through the motor bus bar terminals 120U, 120V and 120W and the ECU terminals 210U, 210V and 210W and connected thereto.

EXPLANATION OF REFERENCE NUMERALS 1 handle
2 column shaft (steering shaft, handle shaft)
10 torque sensor
12 vehicle speed sensor
14 steering angle sensor
20 motor
21 rotational sensor
30, 200 control unit (ECU)
40 CAN
100 blushless motor
110 motor housing
111 ECU mounting flange
112 motor mounting flange
120 stator assembly (ASSY)
130 rotor assembly (ASSY)
140 motor cover
150 motor connecting mechanism

The invention claimed is:
1. A brushless motor comprising a nut-integrated terminal connecting mechanism for inserting a motor bus bar terminal and an ECU terminal for connecting with a bolt and nut, wherein said terminal connecting mechanism has a first elongated-shape slit for inserting said motor bus bar terminal and a second elongated-shape slit for inserting said ECU terminal, and said first elongated-shape slit and said second elongated-shape slit face opposite directions, and wherein said terminal connecting mechanism is provided with a bracket holder built-in on a side surface of a disk-shaped motor cover, and a terminal cover is mounted on and removed from said bracket holder by using a bolt.

2. The brushless motor according to claim 1, wherein said motor bus bar terminal and said ECU terminal are integrated with each other by inserting a bolt.

3. The brushless motor according to claim 2, wherein said motor bus bar terminal and said ECU terminal are provided with a screw hole or a circular hole that is engaged with said bolt.

4. The brushless motor according to claim 1, wherein said first and second slits are respectively elongate holes with a degree of freedom in a motor axial direction and in a motor radial direction such that said first and second slits are capable of absorbing variations in terminal size.

5. The brushless motor according to claim 1, wherein said motor cover is made of aluminum, zinc alloy, magnesium alloy, or sheet metal, a bearing is disposed on a central portion of said motor cover, a periphery of said motor cover is fixed on a stator assembly, and a rotor shaft is held by said bearing of said motor cover and a bearing of said stator assembly.

6. An electric power steering apparatus that is drive-controlled by said brushless motor according to Claim 1, and applies an assist force to a steering system of a vehicle by a current command value calculated based on at least a steering torque.

7. A vehicle equipped with said electric power steering apparatus according to claim 6 by inserting said bolt for mounting.

* * * * *